US012244047B2

(12) United States Patent
Kämäräinen et al.

(10) Patent No.: US 12,244,047 B2
(45) Date of Patent: Mar. 4, 2025

(54) RADIO FREQUENCY FILTERS HAVING A CIRCUIT BOARD WITH MULTIPLE RESONATOR HEADS, AND RESONATOR HEADS HAVING MULTIPLE ARMS

(71) Applicant: CommScope Italy S.R.L., Agrate Brianza (IT)

(72) Inventors: Tero Kämäräinen, Tupos (FI); Marko Tapani Uusitalo, Oulu (FI)

(73) Assignee: CommScope Italy S.R.L., Agrate Brianza (IT)

( * ) Notice: Subject to any disclaimer, the term of this patent is extended or adjusted under 35 U.S.C. 154(b) by 278 days.

(21) Appl. No.: 17/782,034

(22) PCT Filed: Dec. 2, 2020

(86) PCT No.: PCT/EP2020/084226
§ 371 (c)(1),
(2) Date: Jun. 2, 2022

(87) PCT Pub. No.: WO2021/110724
PCT Pub. Date: Jun. 10, 2021

(65) Prior Publication Data

US 2023/0006323 A1 Jan. 5, 2023

Related U.S. Application Data

(60) Provisional application No. 63/044,417, filed on Jun. 26, 2020, provisional application No. 62/943,432, filed on Dec. 4, 2019.

(30) Foreign Application Priority Data

Sep. 8, 2020 (IT) ........................ 102020000021256

(51) Int. Cl.
*H01P 1/205* (2006.01)
*H01P 1/208* (2006.01)

(52) U.S. Cl.
CPC ............ *H01P 1/2053* (2013.01); *H01P 1/208* (2013.01)

(58) Field of Classification Search
CPC ........ H01P 1/2053; H01P 1/205; H01P 1/208; H01P 1/207; H01P 1/202; H01P 1/20327; H01P 1/20336; H01P 1/201; H01P 1/20
See application file for complete search history.

(56) References Cited

U.S. PATENT DOCUMENTS

| | | | | |
|---|---|---|---|---|
| 4,268,809 A * | 5/1981 | Makimoto | H01P 1/2053 333/202 |
| 5,812,036 A | 9/1998 | Estrada | |

(Continued)

FOREIGN PATENT DOCUMENTS

| | | | |
|---|---|---|---|
| EP | 0008790 A1 | 3/1980 |
| EP | 0859422 A1 | 8/1998 |

(Continued)

OTHER PUBLICATIONS

Italian Search Report corresponding to Italian Application No. 102020000021256 (May 25, 2021).

(Continued)

*Primary Examiner* — Stephen E. Jones
(74) *Attorney, Agent, or Firm* — Myers Bigel, P.A.

(57) ABSTRACT

Filter devices are provided herein. In some embodiments, a filter device includes first and second resonator stalks in respective first and second openings in a PCB that has first and second metal resonator heads that are on the first and second resonator stalks, respectively. Moreover, in some embodiments, a filter device includes a metal resonator head that has a loop portion on a resonator stalk and a plurality of arms that extend outward from the loop portion.

17 Claims, 12 Drawing Sheets

(56) References Cited

U.S. PATENT DOCUMENTS

| | | | | | |
|---|---|---|---|---|---|
| 5,990,763 | A * | 11/1999 | Sipila | H01P 11/007 333/202 |
| 10,050,323 | B2 | 8/2018 | Tkadlec et al. | |
| 10,236,550 | B2 | 3/2019 | Tamiazzo et al. | |
| 2008/0100402 | A1 | 5/2008 | Rogozine | |
| 2018/0277918 | A1 * | 9/2018 | Kim | H01P 5/024 |

FOREIGN PATENT DOCUMENTS

| | | | |
|---|---|---|---|
| EP | 3386027 | A1 | 10/2018 |
| JP | S5535560 | A | 3/1980 |
| JP | S6264101 | A | 3/1987 |
| JP | 2018535617 | A | 11/2018 |
| WO | 2014029263 | A1 | 2/2014 |

OTHER PUBLICATIONS

Notification of Transmittal of the International Search Report and the Written Opinion of the International Searching Authority, or the Declaration, in corresponding PCT Application No. PCT/EP2020/084226 (Mar. 12, 2021).

European Office Action corresponding to European Application No. 20815828.7 (6 pages) (Apr. 2, 2024).

* cited by examiner

RADIO FREQUENCY FILTERS HAVING A CIRCUIT BOARD WITH MULTIPLE RESONATOR HEADS, AND RESONATOR HEADS HAVING MULTIPLE ARMS

CLAIM OF PRIORITY

This application is a 35 U.S.C. § 371 national stage application of PCT Application No. PCT/EP2020/084226, filed on Dec. 2, 2020, which claims priority to U.S. Provisional Patent Application No. 62/943,432, filed Dec. 4, 2019, U.S. Provisional Patent Application No. 63/044,417, filed Jun. 26, 2020, and Italian Patent Application No. 102020000021256, filed Sep. 8, 2020, the disclosures of which are hereby incorporated herein by reference. The above-referenced PCT Application was published in the English language as International Publication No. WO 2021/110724 A1 on Jun. 10, 2021.

FIELD

The present disclosure relates to communication systems and, in particular, to radio frequency ("RF") filters.

BACKGROUND

One type of filter for RF applications is a resonator filter comprising a group of coaxial resonators. The overall transfer function of the resonator filter is a function of the responses of the individual resonators as well as the electromagnetic coupling between different pairs of resonators within the group.

U.S. Pat. No. 5,812,036 ("the '036 patent"), the entire disclosure of which is incorporated herein by reference, discloses different resonator filters having different configurations and topologies of resonators. For example, the '036 patent discusses a six-stage resonator filter having a 2-by-3 array of cavities between an input terminal and an output terminal, where each cavity has a respective resonator therein. The resonator filter also includes a conductive housing, which defines a portion of the outer conductors of each of the resonators. The remainder of each resonator outer conductor is formed by interior common walls. The resonators may comprise, for example, either air-filled cavity resonators or dielectric-loaded coaxial resonators.

SUMMARY

A filter device, according to some embodiments herein, may include a housing. The filter device may include a plurality of resonator stalks inside the housing. Moreover, the filter device may include a printed circuit board ("PCB") including a plurality of metal resonator heads that are electrically connected to the resonator stalks, respectively.

In some embodiments, each of the metal resonator heads respectively includes: a loop portion on a respective one of the resonator stalks; and at least one arm portion that extends outward from the loop portion. The PCB may include a plurality of first openings, and the resonator stalks may extend upward through the first openings, respectively, and through the loop portions, respectively. Moreover, the PCB may include a plurality of second openings that are between respective pairs of the arm portions that extend toward each other.

According to some embodiments, the resonator stalks may be respective first resonator stalks and the PCB may be a first PCB on the first resonator stalks. Moreover, the filter device may include second resonator stalks inside the housing; a second PCB on the second resonator stalks; and a wall inside the housing between the first resonator stalks and the second resonator stalks.

In some embodiments, the filter device may include a low-pass filter on the PCB. Moreover, the resonator stalks and the housing may be different portions of a single metal piece.

A filter device, according to some embodiments herein, may include first and second resonator stalks in respective first and second openings in a PCB that has first and second metal resonator heads that are on the first and second resonator stalks, respectively.

In some embodiments, the first metal resonator head may include a first loop portion on the first resonator stalk and a first arm portion that extends outward from the first loop portion. The second metal resonator head may include a second loop portion on the second resonator stalk and a second arm portion that extends outward from the second loop portion. Moreover, the first metal resonator head may include a third arm portion that extends outward from the first loop portion, and the second metal resonator head may include a fourth arm portion that extends outward from the second loop portion.

According to some embodiments, the filter device may include third through eleventh resonator stalks in respective third through eleventh openings in the PCB. Moreover, the PCB may have third through eleventh metal resonator heads that are on the third through eleventh resonator stalks, respectively.

A filter device, according to some embodiments herein, may include a housing and a plurality of resonators inside the housing. Each of the resonators may include: a respective resonator stalk; and a respective metal resonator head including a loop portion that is on the resonator stalk and a plurality of arms that extend outward from the loop portion.

In some embodiments, the filter device may include a PCB, and the metal resonator heads may be on the PCB. The PCB may be on respective upper portions of the resonator stalks. The metal resonator heads may be on an upper surface of the PCB. The upper portions of the resonator stalks may extend through respective openings in the PCB to protrude upward beyond the upper surface of the PCB. Moreover, the filter device may include a low-pass filter on the PCB.

According to some embodiments, the resonator stalks may be respective first resonator stalks, the metal resonator heads may be respective first metal resonator heads, and the filter device may include: second resonator stalks inside the housing; and a wall inside the housing between the first resonator stalks and the second resonator stalks. Moreover, the filter device may include a first PCB including the first metal resonator heads on the first resonator stalks, respectively. The filter device may include a second PCB including second metal resonator heads on the second resonator stalks, respectively. The first and second PCBs may be PCBs of first and second bandpass filters, respectively.

In some embodiments, the metal resonator heads may be respective non-PCB metal resonator heads.

According to some embodiments, a first of the arms of a first of the metal resonator heads may vertically overlap a second of the arms of a second of the metal resonator heads.

A filter device, according to some embodiments herein, may include a housing and a plurality of non-PCB resonators inside the housing. Each of the non-PCB resonators may include: a respective resonator stalk; and a respective metal resonator head including a loop portion that is on the resonator stalk and a plurality of arms that extend outward from the loop portion.

In some embodiments, the resonator stalks may be respective first resonator stalks, and the filter device may include: second resonator stalks inside the housing; and a wall inside the housing between the first resonator stalks and the second resonator stalks. Moreover, the first resonator stalks may be resonator stalks of a first bandpass filter, and the second resonator stalks may be resonator stalks of a second bandpass filter.

DETAILED DESCRIPTION

Pursuant to embodiments of the present inventive concepts, RF filter devices that include a plurality of resonators are provided. In a typical cavity filter, the resonators act as the inner conductor and the housing acts as the outer conductor. Each resonator may include a stalk and a resonator head. The base of the stalk may be galvanically connected to the housing and the distal end of the stalk may be spaced apart from the housing. Inductive coupling between adjacent resonators can be achieved by a gap between a housing cavity's partition walls. Similarly, capacitive coupling may occur between the spaced-apart distal ends of adjacent stalks. Resonator heads may be mounted at or near the distal ends of the stalks to increase the capacitive coupling. The amount of capacitive coupling between resonators can be adjusted (e.g., increased) by the positioning, size, and form of the resonator heads, which may also be referred to herein as "resonator hats."

It may be desirable to provide inexpensive resonator heads. Though planar (i.e., flat) metal resonator heads may be less expensive than dish-shaped resonator heads, coupling between resonator heads may be inconsistent if the resonator heads are at different heights or are bent (and thus not quite planar). According to embodiments of the present inventive concepts, however, a PCB may facilitate the use of resonator heads that are inexpensive, flat, precisely (e.g., consistently) positioned, and relatively easy to assemble.

For example, according to embodiments of the present inventive concepts, multiple resonator heads that provide coupling (e.g., capacitive coupling) between resonators can be formed on a single PCB that is then mounted on multiple resonator stalks. In other embodiments, a transmission line and/or inductive couplings may be formed on a single PCB, and this PCB may be mounted on multiple resonator stalks. Moreover, stripline-based filter structures, such as a low-pass filter, can also be implemented on the same single-piece PCB that has multiple resonator heads. Other elements that can be included on the PCB are connector pins, connectors, and RF couplers. Because filter elements, such as resonator heads, may be implemented with a single-piece PCB, variation during manufacturing can be reduced and assembly tolerances can be highly-controlled.

Implementing filter elements on a PCB may also reduce the need for filter tuning. Tuning adjustments to a PCB-based filter can be performed by conventional techniques, such as by bringing a metallic material closer to an open end of a coupling element (e.g., a resonator head). Moreover, the present inventive concepts may facilitate other filter tuning techniques, such as tuning by removing metal from a PCB using a laser.

Example embodiments of the present inventive concepts will be described in greater detail with reference to the attached figures.

Figure 1A:
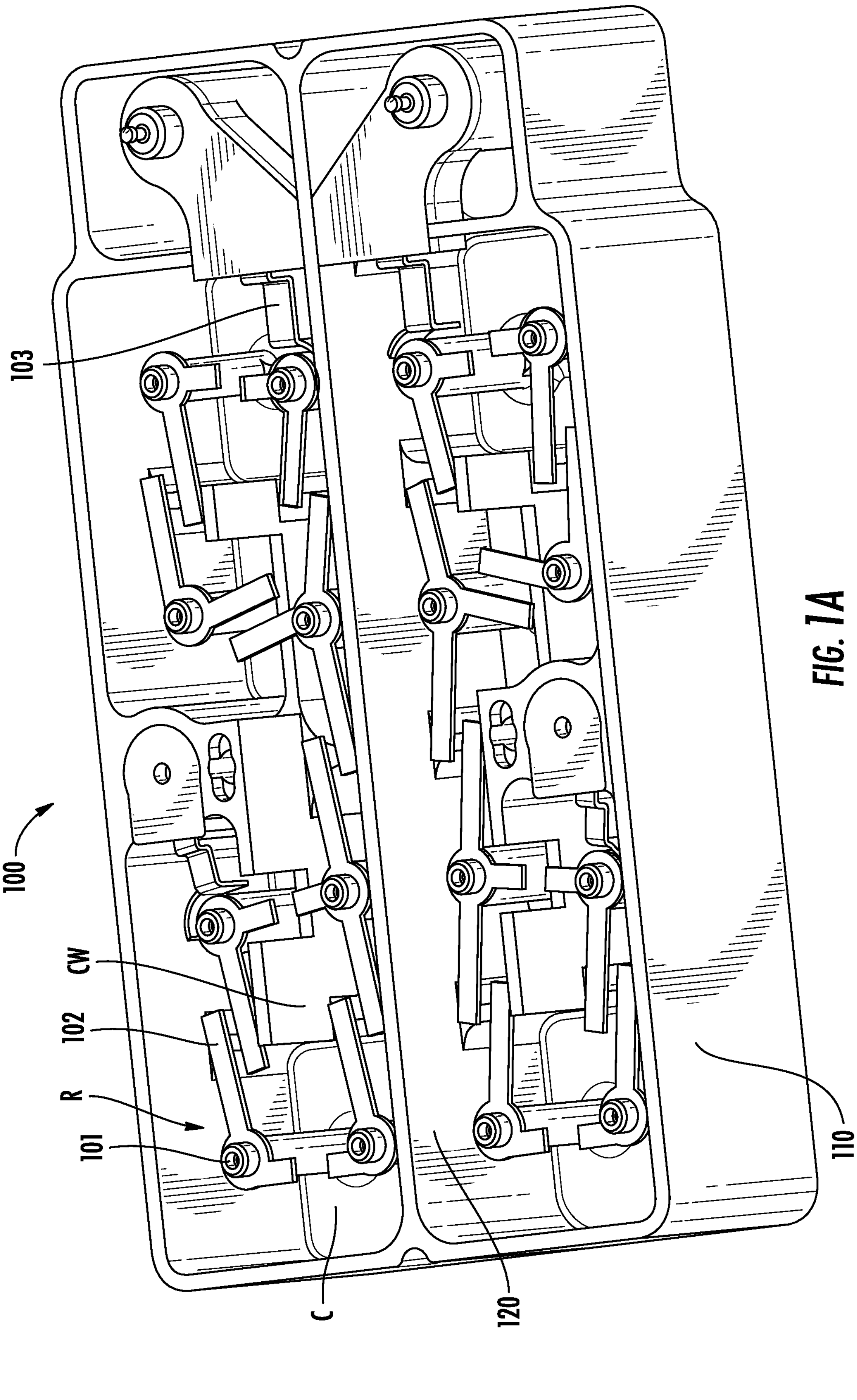
FIG. 1A is a top perspective view of the inside of an RF filter according to embodiments of the present inventive concepts.

FIG. 1A is a top perspective view of the inside of an RF filter device 100 according to embodiments of the present inventive concepts. The filter 100 is a device that includes resonators R in respective cavities C inside a housing 110. Each resonator R includes a resonator stalk 101 and a metal resonator head 102 that is on the stalk 101. In some embodiments, the resonator heads 102 may be respective flat (rather than dish-shaped) resonator heads.

An interior wall 120 may extend inside the housing 110 between two filters comprising resonators R. For example, the two filters may have separate transmission paths, respectively, to two ports of the filter 100. The ports may be coupled to respective antenna ports, such as ports of a base station antenna (e.g., a 64T64R antenna or other massive multiple-input, multiple-output ("MIMO") antenna). In some embodiments, the two filters that are divided by the interior wall 120 may be identical mirrored bandpass filters. The housing 110 may also include cavity walls CW that are between the interior wall 120 and an outer wall of the housing 110. The cavities C may be defined by combinations of cavity walls CW, the interior wall 120, and/or outer walls. A lid (not shown in FIG. 1A) may cover the cavities C.

Adjacent, spaced-apart resonators R may be electromagnetically (e.g., capacitively and/or inductively) coupled to each other. Moreover, a metal component 103 that is adjacent and spaced apart from a resonator R may couple the resonator R to a port of the filter 100.

Figure 1B:
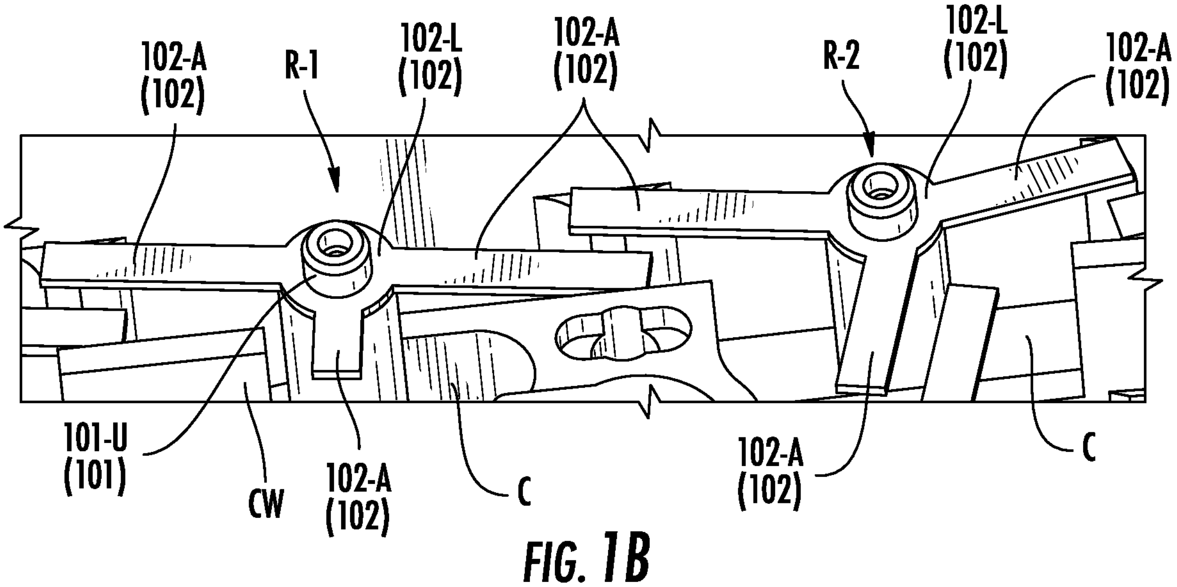
FIG. 1B is an enlarged view of a portion of the filter of FIG. 1A.

FIG. 1B is an enlarged view of a portion of the filter 100 (FIG. 1A). In particular, FIG. 1B shows a pair of resonators R-1, R-2 that are capacitively coupled to each other by respective resonator heads 102. Each resonator head 102 includes a loop portion 102-L that extends around an upper portion 101-U of a resonator stalk 101. Each resonator head 102 also includes at least one arm portion 102-A that is connected to, and extends outward (e.g., protrudes laterally) from, the loop portion 102-L. In some embodiments, two or three arm portions 102-A may extend from a loop portion 102-L. The loop portion 102-L and the arm portion(s) 102-A extending therefrom may be different portions of a single metal piece.

An arm portion 102-A of a first resonator R-1 may extend alongside an arm portion 102-A of a second resonator R-2 to be coupled thereto. For example, the resonator heads 102 may be copper (or other conductive) coupling elements that contribute to a quality ("Q") value of 1800 for the filter 100. Accordingly, the loop portions 102-L and the arm portions 102-A may each comprise copper. The terms "arm" and "arm portion" may be used interchangeably herein.

Figure 1C:
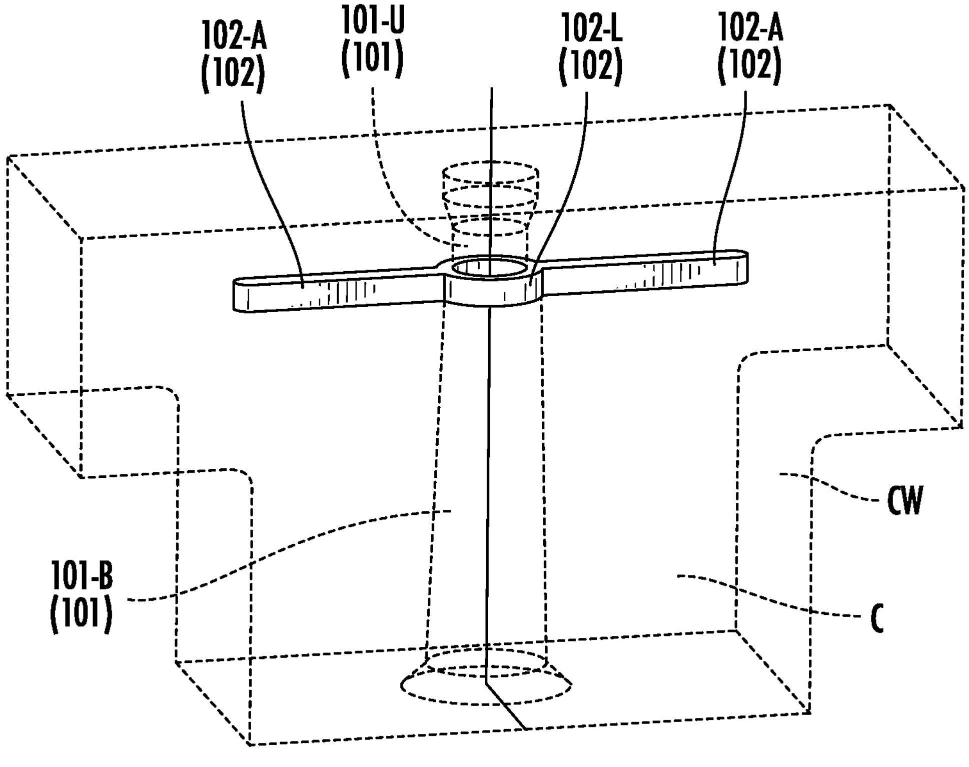
FIG. 1C is a side perspective view of a cavity of the filter of FIG. 1A.

FIG. 1C is a side perspective view of a cavity C of the filter 100 (FIG. 1A). The cavity C may be defined by one or more cavity walls CW. Though the cavity walls CW are typically metal, they are depicted transparently in FIG. 1C for ease of illustrating a resonator stalk 101 and a metal resonator head 102 inside the cavity C. The stalk 101 inside the cavity C may include a base portion 101-B and an upper portion 101-U. In some embodiments, the stalk 101 may have a tapered shape such that the upper portion 101-U is narrower than the base portion 101-B. A loop portion 102-L of the resonator head 102 may be electrically connected to the upper portion 101-U. For example, the loop portion 102-L may be soldered to the upper portion 101-U. In some embodiments, resonator heads 102 may be formed by soldering loop portions 102-L of a flat metal sheet to respective stalks 101 and then cutting away some of the interconnecting metal between the stalks 101 to provide pairs of spaced-apart arm portions 102-A.

The upper portion 101-U of a stalk 101 may be the (i) top half, (ii) top third, or (iii) top quarter of the stalk 101. Accordingly, a resonator head 102 that is on the stalk 101 is closer to the top end of the stalk 101 than to the bottom end of the stalk 101. Moreover, the stalk 101 may also be referred to as a "resonator pedestal."

Figure 1D:
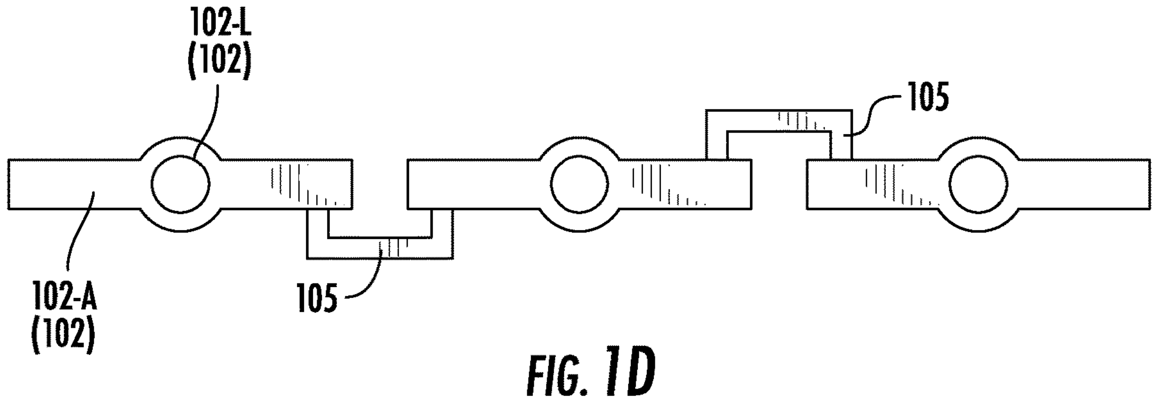
FIGS. 1D and 1E are top views illustrating a method of forming metal resonator heads of the filter of FIG. 1A.
Figure 1E:
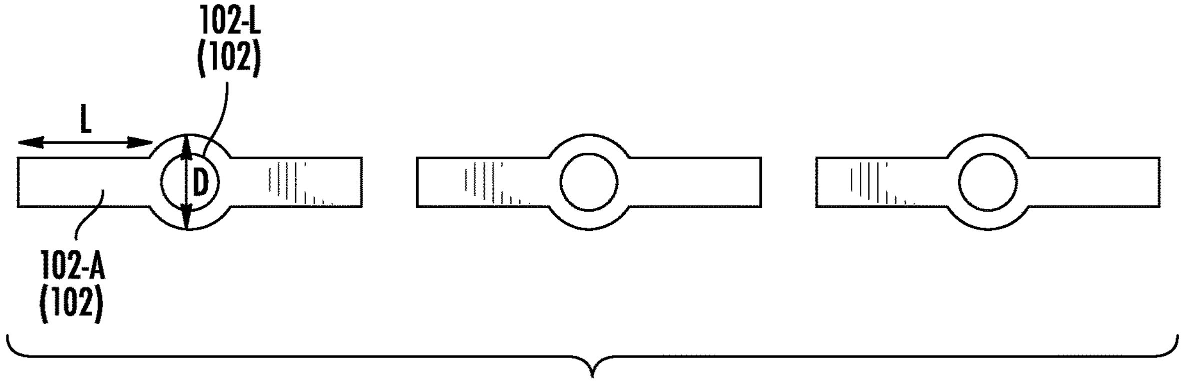

FIGS. 1D and 1E are top views illustrating a method of forming metal resonator heads 102 of the filter 100 (FIG. 1A). Referring to FIG. 1D, multiple resonator heads 102 may be formed from the same sheet of metal. Accordingly, interconnecting metal, such as metal bridges 105, may connect adjacent resonator heads 102. Referring to FIG. 1E, the metal bridges 105 may be removed (e.g., by cutting) to separate the resonator heads 102 from each other. In some embodiments, the metal bridges 105 may be removed after loop portions 102-L of the resonators 102 are soldered to respective resonator stalks 101 (FIG. 1C). Moreover, FIG. 1E also shows that an outer diameter D of a loop portion 102-L may be narrower than a length L of an arm portion 102-A that protrudes from the loop portion 102-L.

Figure 2A:
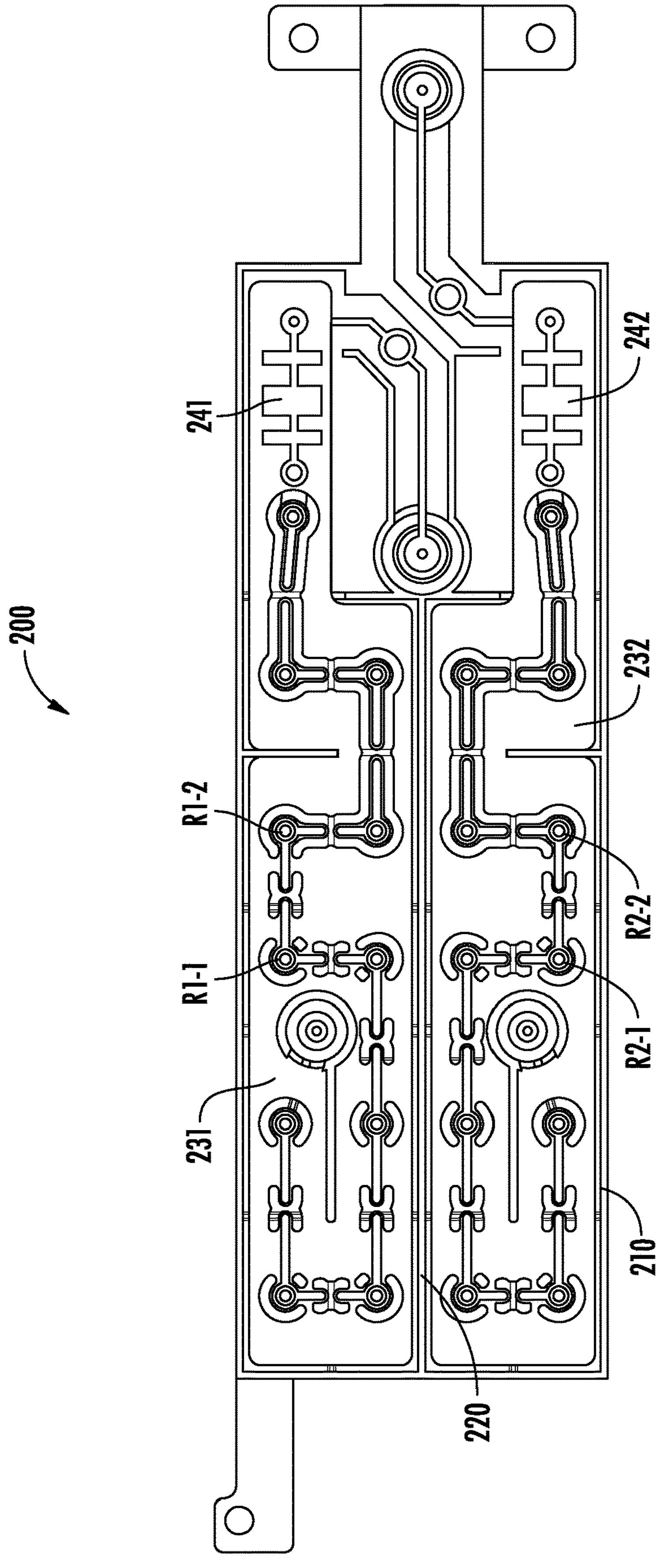
FIG. 2A is a top view of the inside of an RF filter according to further embodiments of the present inventive concepts.

FIG. 2A is a top view of the inside of an RF filter device 200 according to further embodiments of the present inventive concepts. As with the filter 100 (FIG. 1A), the filter 200 has resonators R that are inside a housing 210. For example, the filter 200 may include two filters, and resonators R1 of the first filter may be separated from resonators R2 of the second filter by an interior wall 220 that is inside the housing 210. The resonators R1 and R2 may provide respective paths (e.g., transmission paths) between two pairs of ports of the filter 200. Some of the ports may be coupled to respective antenna ports, such as ports of a base station antenna. In FIG. 2A, the first and second filters each include eleven resonators R. In some embodiments, however, more (e.g., twelve or more) or fewer (e.g., ten, nine, eight, or fewer) resonators R may be included. Moreover, for simplicity of illustration, only two resonators R1-1 and R1-2 are labeled for the first filter, and only two resonators R2-1 and R2-2 are labeled for the second filter.

Unlike the filter 100, multiple metal resonator heads 202 (FIG. 2B) of the resonators R of the filter 200 may be on a single PCB. For example, resonators R1 of the first filter and resonators R2 of the second filter may have first and second pluralities of resonator heads 202 on respective PCBs 231 and 232. Accordingly, each PCB 231 and 232 may have multiple resonator heads 202. In some embodiments, the PCBs 231 and 232 may comprise high-frequency laminates, such as RO3003™ laminates by Rogers Corporation. Moreover, in some embodiments, the PCB 231 and/or the PCB 232 may include additional electrical components. As an example, the PCBs 231 and 232 may include low-pass filters 241 and 242, respectively.

The PCBs 231 and 232 facilitate easier assembly of the filter 200 relative to assembly of the filter 100. For example, because the filter 200 has PCB-based resonator heads 202 instead of non-PCB resonator heads 102 (FIG. 1A), metal does not need to be cut to form the resonator heads 202. By contrast, cutting away interconnecting metal to form the resonator heads 102 may move and/or bend the resonator heads 102. As a result, tolerances for the PCB-based filter 200 may be improved relative to the filter 100.

The filters 100 and 200 may each have an operational frequency range (e.g., a pass band) of 3480 megahertz ("MHz") to 3800 MHz or a portion thereof. Over the operational frequency range, the maximum insertion loss of the filter 200 may be 1.8 decibels ("dB"), the insertion loss variation may be under 1 dB, and the maximum group delay distortion may be 65 nanoseconds ("ns").

In some embodiments, the housing 210 may be a metal housing. For example, a single machined or die-cast piece may, in some embodiments, comprise exterior walls, a bottom surface, cavity walls CW (FIG. 2C), the interior wall 220, and/or resonator stalks 201 (FIG. 2B) of the housing 210. As an example, the stalks 201 and the housing 210 may be different portions of a single metal piece (e.g., the stalks 201 may be die-cast with the housing 210) or the stalks 201 may be connected to the housing 210 by screws or soldering. Likewise, referring to FIG. 1A, a single machined or die-cast piece may, in some embodiments, comprise exterior walls, a bottom surface, cavity walls CW, an interior wall 120, and/or resonator stalks 101 of a housing 110. A lid 290 (FIG. 2G) may cover the cavities C.

Figure 2B:
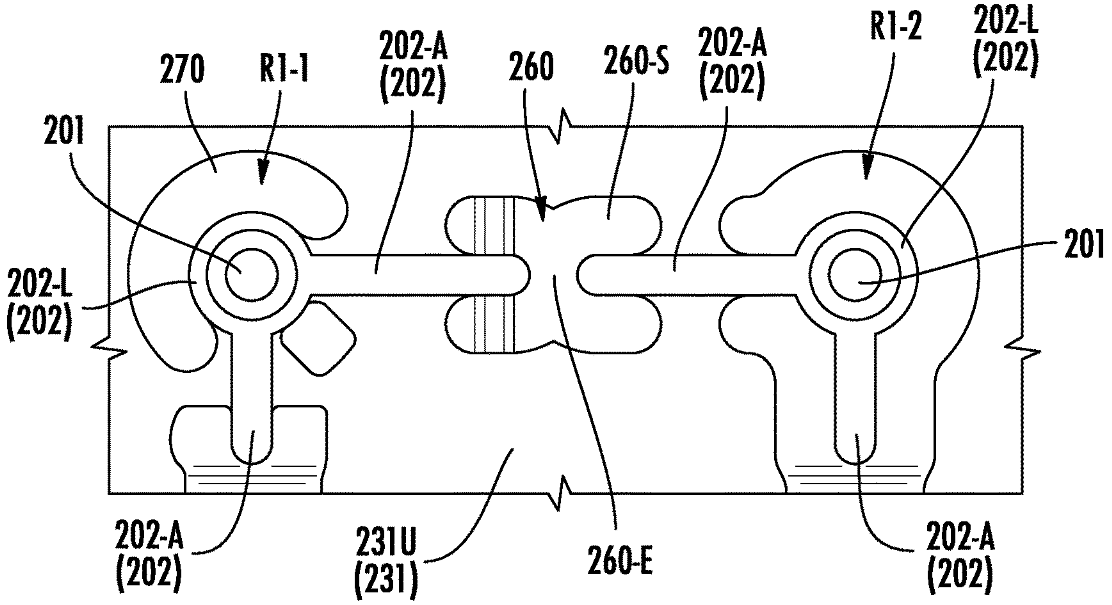
FIG. 2B is an enlarged view of a portion of the filter of FIG. 2A.

FIG. 2B is an enlarged view of a portion of an upper surface 231U of the PCB 231 of the filter 200 (FIG. 2A). The PCB 231 may have openings 260 between respective pairs of resonators R. As used herein, the term "pair" may refer to two resonators R (or components thereof) that have an opening 260 therebetween and do not have a third resonator R therebetween. For example, FIG. 2B shows an opening 260 that is between (a) an arm portion 202-A of a metal resonator head 202 of a first resonator R1-1 and (b) an arm portion 202-A of a metal resonator head 202 of a second resonator R1-2. In some embodiments, the opening 260 may include a middle/end portion 260-E that is between respective ends of the pair of arm portions 202-A, as well as one or more side portions 260-S that extend along sides of the pair of arm portions 202-A. As an example, the opening 260 may be an H-shaped or U-shaped hole in the PCB 231.

Each resonator head 202 may have at least one arm portion 202-A. As an example, the resonator heads 202 shown in FIG. 2B each have two arm portions 202-A. Other resonator heads 202 may likewise have two arm portions 202-A or may have one arm portion 202-A or three arm portions 202-A. In some embodiments, each arm portion 202-A may be paired with and electromagnetically coupled to an arm portion 202-A of another resonator R.

Each resonator head 202 may also have a loop portion 202-L from which one or more arm portions 202-A extend outward (i.e., laterally). Similar to what is shown in FIG. 1E, a length of an arm portion 202-A may be longer than an outer diameter of a loop portion 202-L from which the arm portion 202-A extends. Moreover, the loop portion 202-L and the arm portion(s) 202-A extending therefrom may be different portions of a single metal piece.

A plurality of loop portions 202-L are on, and electrically connected to (e.g., via solder), respective resonator stalks 201. For example, a loop portion 202-L may extend continuously around the circumference of an upper portion 201-U (FIG. 2C) of a stalk 201. The loop portion 202-L does not, however, need to completely surround the stalk 201. In some embodiments, the loop portion 202-L may extend partially around the circumference of an upper portion 201-U of the stalk 201. For example, the loop portion 202-L may extend about 180 degrees (or fewer) around the circumference of the upper portion 201-U. Accordingly, the term “loop,” as used herein, may refer to a partial loop or a complete (e.g., 360-degree) loop.

The PCB 231 may, in some embodiments, have curved openings 270 that extend adjacent respective loop portions 202-L. An opening 270 may be spaced apart from an adjacent opening 260 or may be connected to the opening 260. Positioning the openings 260 and 270 (which replace PCB dielectric material) near the resonator heads 202 can improve Q performance of the filter 200 relative to a filter having a PCB that lacks the openings 260 and 270. For example, the filter 200 may have a Q value above 1500.

Figure 2C:
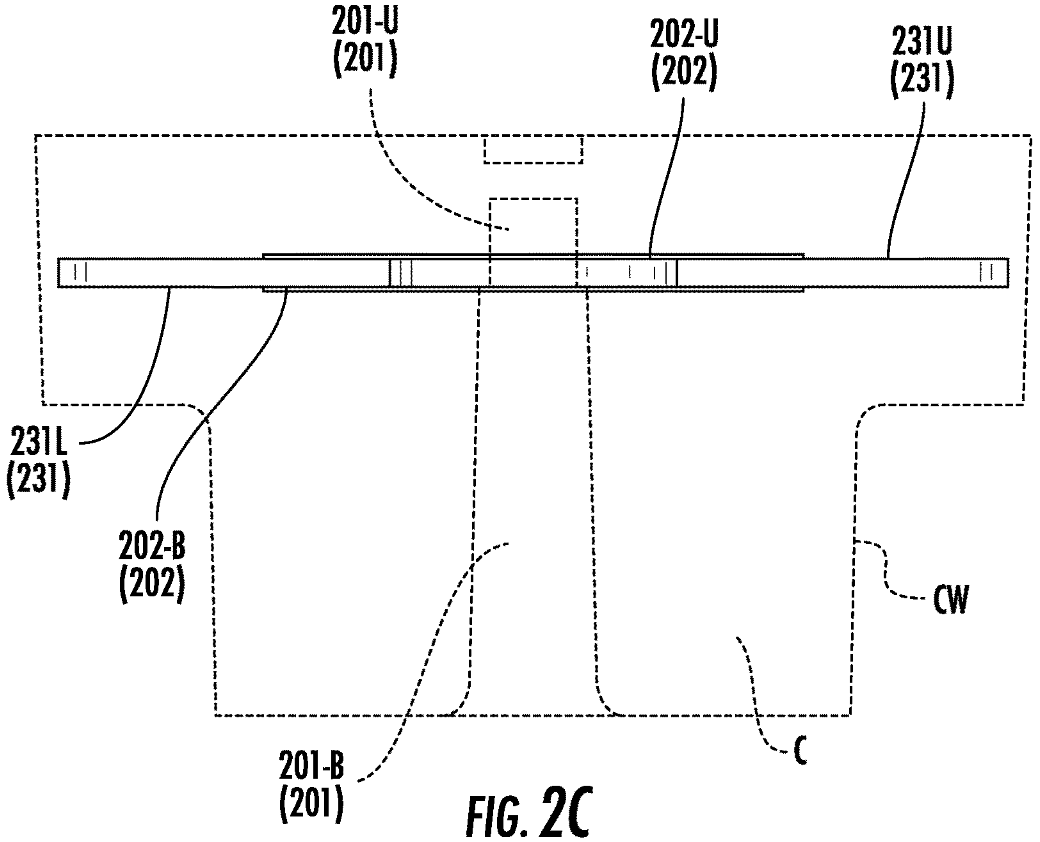
FIG. 2C is a side view of a cavity of the filter of FIG. 2A.

FIG. 2C is a side view of a cavity C of the filter 200 (FIG. 2A). Dimensions of the cavity C may be, for example, 9.2 millimeters (“mm”) in width, 16 mm in length, and 14 mm in height. Though cavity walls CW of the cavity C are typically metal, they are depicted transparently in FIG. 2C for ease of illustrating a resonator stalk 201 and a PCB 231 inside the cavity C.

As shown in FIG. 2C, the PCB 231 may have an upper surface 231U and an opposite lower surface 231L and may be on an upper portion 201-U of the stalk 201. In some embodiments, a metal resonator head 202 of a resonator R (FIG. 2B) may include a lower portion 202-B that is on the lower surface 231L of the PCB 231 and an upper portion 202-U that is on the upper surface 231U of the PCB 231. The upper and lower portions 202-U and 202-B may each include a loop portion 202-L (FIG. 2B) and at least one arm portion 202-A (FIG. 2B). Moreover, the stalk 201 includes a base portion 201-B, which may have a diameter that is wider than a diameter of the upper portion 201-U and wider than an inner diameter of the loop portion 202-L. Accordingly, the resonator head 202 may rest at a relatively high position on the stalk 201, such as on the top quarter thereof.

Figure 2D:
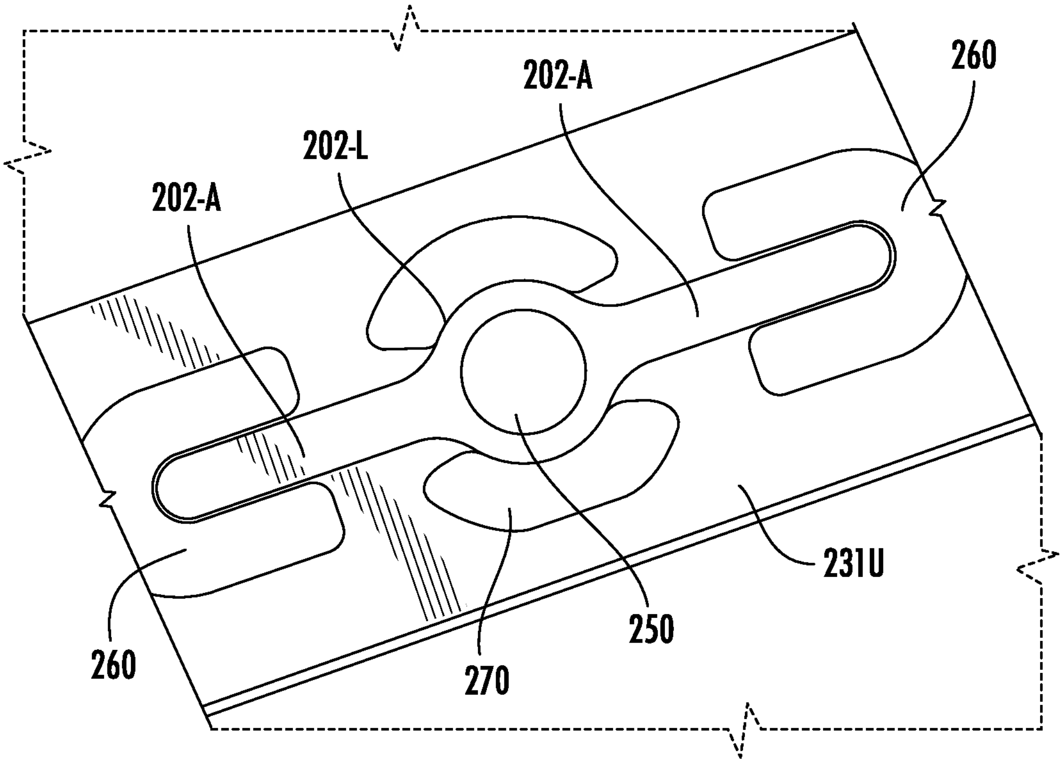
FIGS. 2D and 2E are top views illustrating different shapes of a portion of a PCB of the filter of FIG. 2A.
Figure 2E:
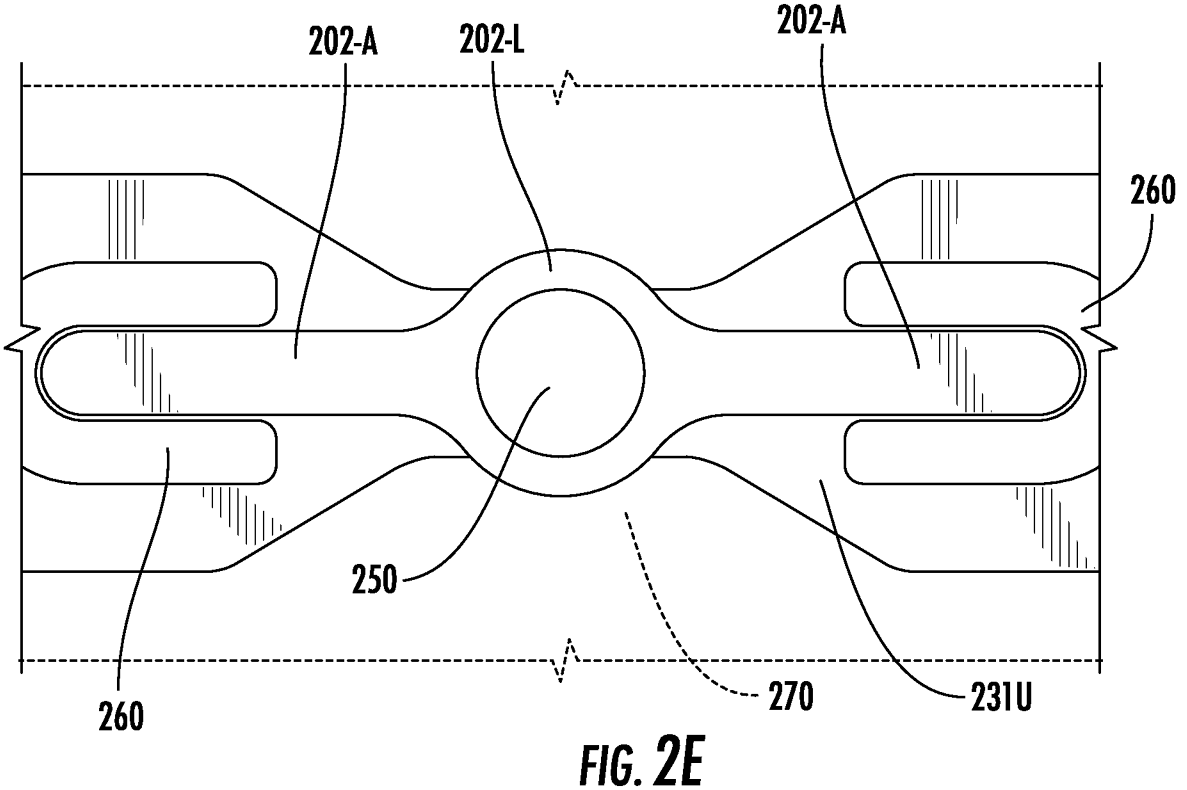

FIGS. 2D and 2E are top views illustrating different shapes of a portion of the PCB 231 of the filter 200 (FIG. 2A). The portion shown in FIG. 2D illustrates a metal resonator head 202 having a loop portion 202-L that is bordered by two openings 270 that are spaced apart from respective outer edges (i.e., opposite outer sidewalls) of the PCB 231. Accordingly, the PCB 231 in FIG. 2D has a generally rectangular shape around the resonator head 202.

The PCB 231 of the filter 200 is not limited, however, to the generally rectangular shapes shown in FIGS. 2A and 2D. For example, the PCB 231 of FIG. 2E has a shape that tapers toward the loop portion 202-L of the resonator head 202. This tapered shape is due to larger openings 270 that eliminate portions of the outer edges of the more rectangular PCB 231 of FIG. 2D. The tapered PCB 231 of FIG. 2E thus has less dielectric material than the more rectangular shape in FIG. 2D. As a result, the tapered PCB 231 of FIG. 2E may have slightly improved performance (e.g., a Q value of the filter 200 that increases to 1560 from 1530) relative to the more rectangular PCB 231 of FIG. 2D.

Figure 2F:
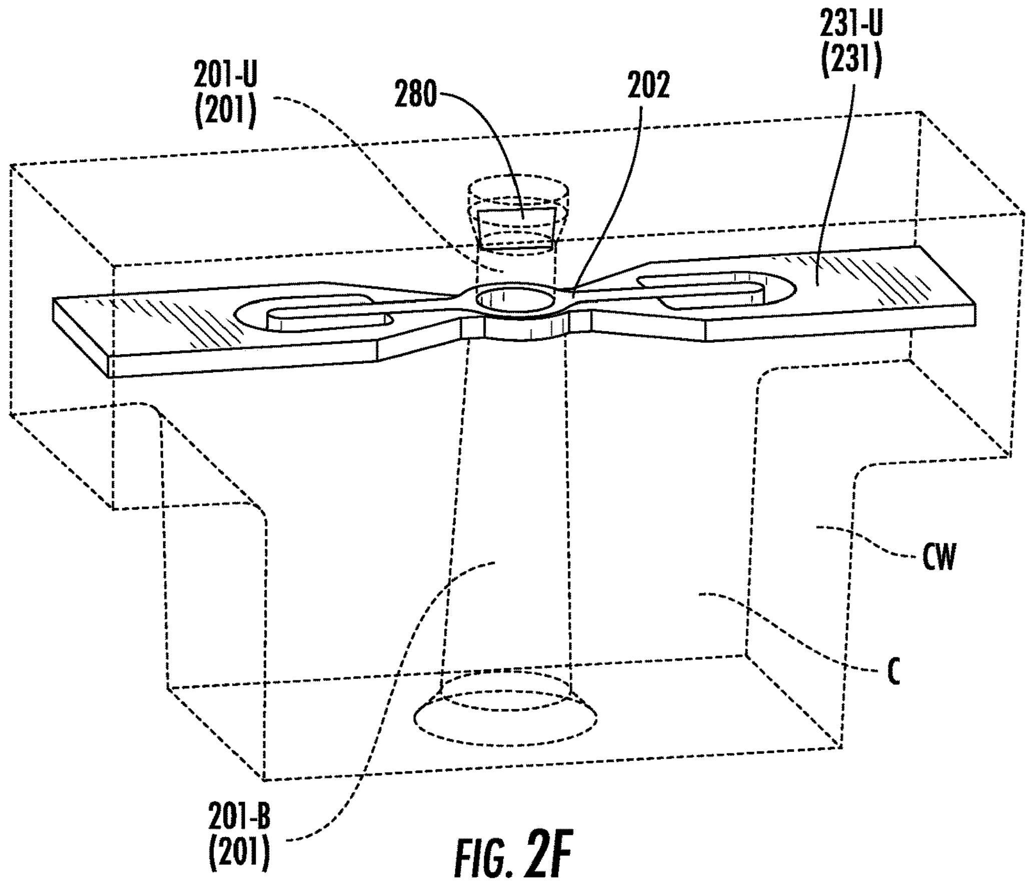
FIG. 2F is a side perspective view of a cavity of the filter of FIG. 2A.

FIGS. 2D and 2E also show that the PCB 231 has an opening 250 that connects with an opening of the loop portion 202-L of the resonator head 202. The PCB 231 can thus be placed on a resonator stalk 201 (FIG. 2B) having an upper portion 201-U (FIG. 2C) that fits in the opening 250. In some embodiments, a plurality of stalks 201 may extend upward through (i) respective openings 250 of the PCB 231 and through (ii) respective loop portions 202-L of resonator heads 202. Accordingly, upper portions 201-U (FIG. 2C) of respective stalks 201 may protrude upward beyond an upper surface 231U of the PCB 231, as demonstrated by the stalk 201 that is shown in FIG. 2F. The filter 200 may likewise include stalks 201 that extend through respective openings in a second PCB 232 (FIG. 2A). Moreover, loop portions 202-L of resonator heads 202 may be electrically connected to (e.g., via solder) upper portions 201-U of respective stalks 201.

FIG. 2F is a side perspective view of a cavity C of the filter 200 (FIG. 2A). As shown in FIG. 2F, a tuning element 280 may vertically overlap an upper portion 201-U of a resonator stalk 201 that is in the cavity C. The tuning element 280 may be a dielectric tuning element or a metal tuning element, as both a dielectric tuning element and a metal tuning element can change capacitive coupling(s) (a) between resonators R (FIG. 2A) and/or (b) between resonators R and the housing 210 (FIG. 2A). In some embodiments, the tuning element 280 may be a tuning stub or a tuning screw. Examples of tuning stubs and tuning screws are discussed in U.S. Pat. No. 10,050,323, the entire disclosure of which is incorporated herein by reference.

Figure 2G:
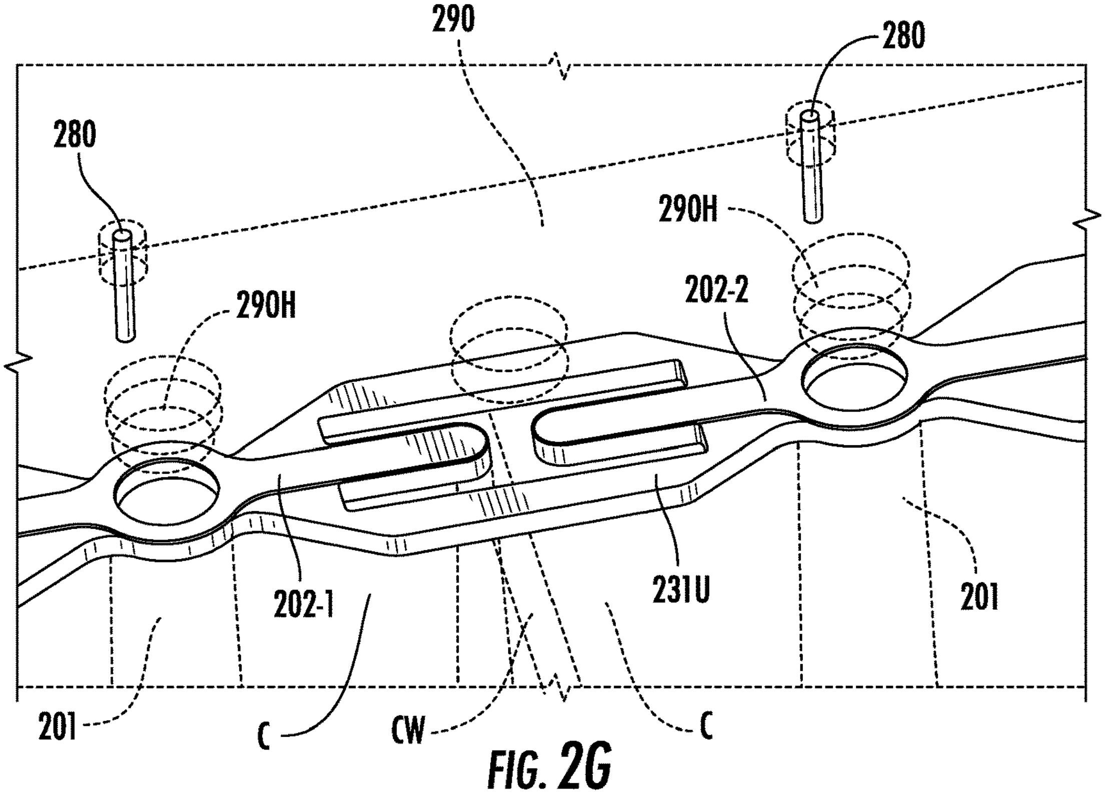
FIGS. 2G and 2H are top perspective views illustrating alternative shapes for the metal resonator heads included in the filter of FIG. 2A.
Figure 2H:
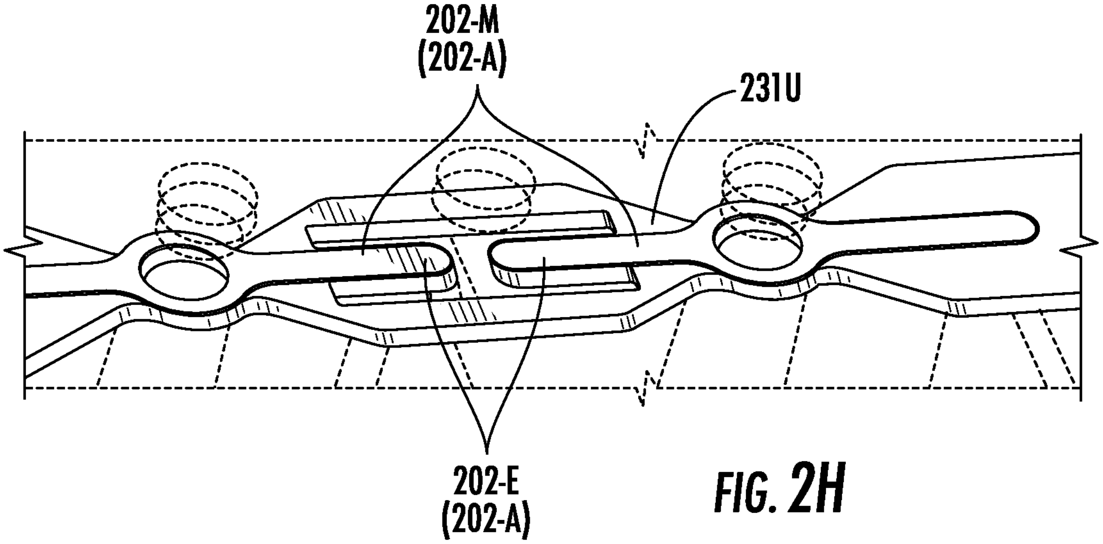

FIGS. 2G and 2H are top perspective views illustrating alternative shapes for the metal resonator heads 202 included in the filter 200 (FIG. 2A). Referring to FIG. 2G, first and second resonator heads 202-1 and 202-2 generally have a propeller shape with rounded end portions. By contrast, FIG. 2H shows resonator head arm portions 202-A having relatively wide end sections 202-E. In particular, each arm portion 202-A may have a main section 202-M and a wide end section 202-E that extends laterally beyond sidewalls of the main section 202-M. Due to their expanded widths, pairs of wide end sections 202-E may have stronger coupling (e.g., capacitive coupling) therebetween than end sections that do not expand laterally relative to main sections 202-M.

FIG. 2G also shows that the filter 200 may include a lid 290 having openings 290H that tuning elements 280 can extend through over respective resonator stalks 201. The tuning elements 280 can be adjusted a vertical distance (i.e., a vertical tuning range) of up to 2.2 mm. In some embodiments, the lid 290 may cover resonators R1 and resonators R2 (FIG. 2A) of respective PCBs 231 and 232 (FIG. 2A). Though the lid 290 is typically a metal (e.g., aluminum)

cover, the lid 290 is depicted transparently in FIG. 2G for ease of illustrating the underlying cavities C and elements therein.

Figure 2I:
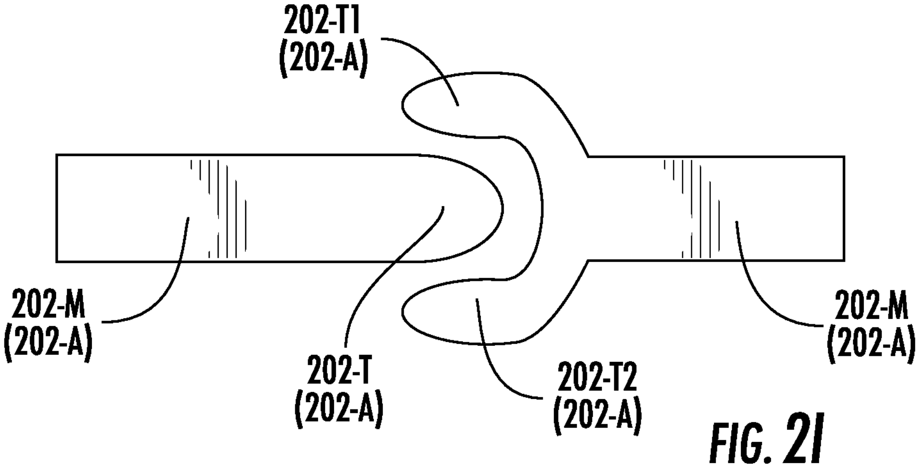
FIGS. 2I and 2J are top views illustrating alternative shapes for the metal resonator heads included in the filter of FIG. 2A.
Figure 2J:
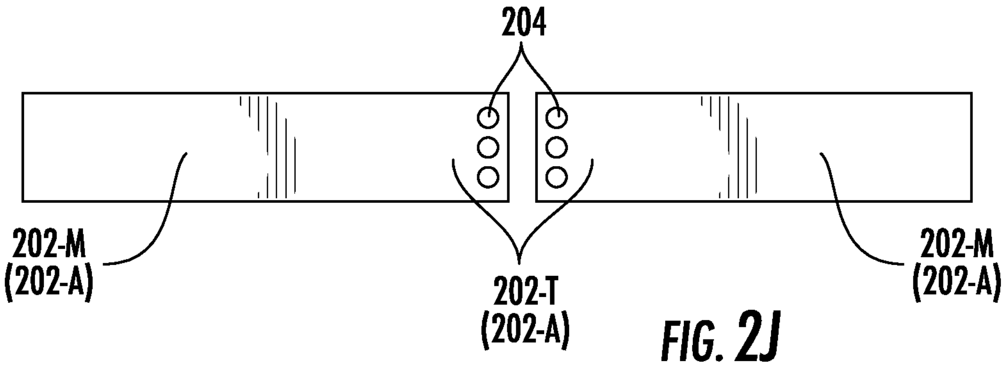

FIGS. 2I and 2J are top views illustrating alternative shapes for the metal resonator heads 202 included in the filter 200 (FIG. 2A). The shapes shown in FIGS. 2I and 2J provide alternative ways of increasing coupling between a pair of resonator heads 202. For example, FIG. 2I illustrates a resonator head arm portion 202-A having an end section 202-T that extends between first and second end sections 202-T1 and 202-T2 of another resonator head arm portion 202-A. Accordingly, the end section 202-T may be coupled to both of the end sections 202-T1 and 202-T2, thus strengthening the coupling between the pair of resonator heads 202.

As another example, FIG. 2J illustrates plated through holes 204 in the end sections 202-T of a pair of resonator head arm portions 202-A. The plated through holes 204 may be plated with a conductive material that extends continuously from an upper surface 231U (FIG. 2C) of a PCB 231 to an opposite lower surface 231L (FIG. 2C) of the PCB 231. For example, the conductive material in the plated through holes 204 may extend continuously from an upper portion 202-U (FIG. 2C) of a resonator head 202 to a lower portion 202-B (FIG. 2C) of the resonator head 202. Moreover, the plated through holes 204 may be in a row near an outer edge of an end section 202-T. As a result, the plated through holes 204 can increase coupling between the pair of resonator heads 202.

Figure 2K:
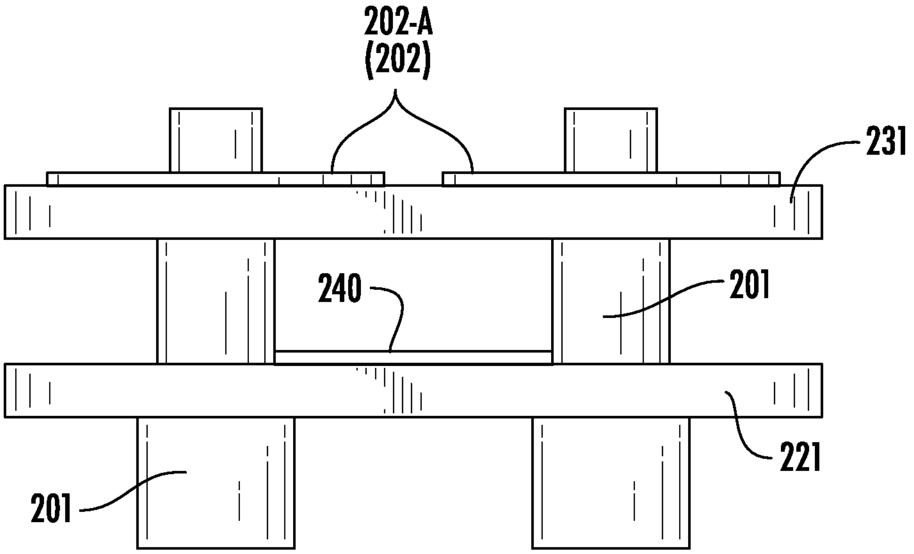
FIGS. 2K to 2M are side views of a portion of the filter of FIG. 2A.
Figure 2L:
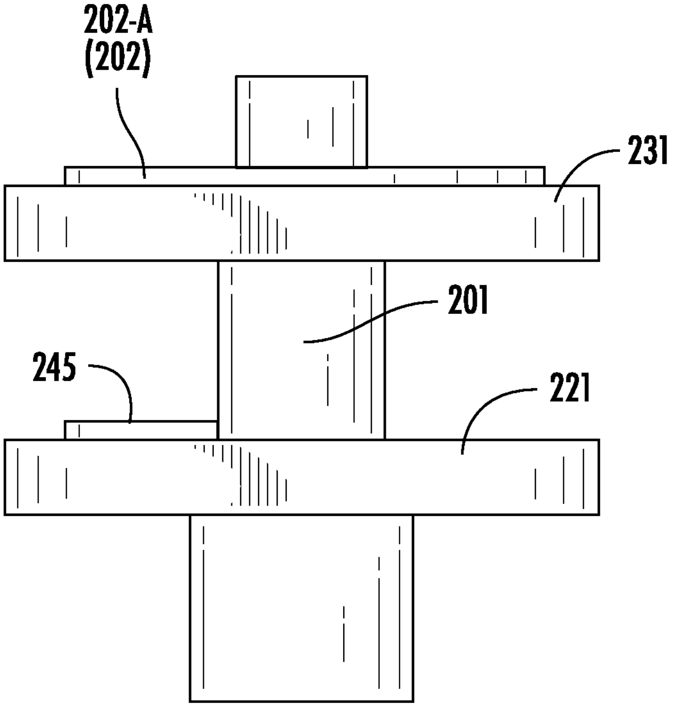
Figure 2M:
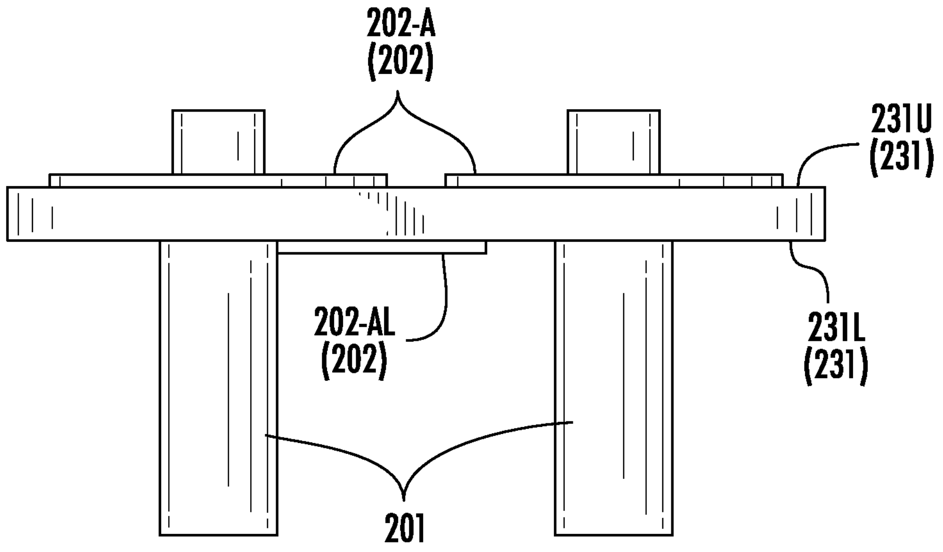

FIGS. 2K to 2M are side views of a portion of the filter 200 (FIG. 2A). Referring to FIG. 2K, a pair of resonator stalks 201 may be coupled to each other by an inductive coupling 240, which may be a conductive layer on a lower PCB 221 that is under an upper PCB 231. Accordingly, the upper PCB 231 may comprise resonator heads 202 and the lower PCB 221 may comprise one or more inductive couplings 240. Like the upper PCB 231, the lower PCB 221 may include openings through which respective stalks 201 vertically protrude. Moreover, referring to FIG. 2L, the lower PCB 221 may, in some embodiments, comprise a transmission line 245.

Referring to FIG. 2M, an arm portion 202-A of a first metal resonator head 202 may, in some embodiments, vertically overlap an arm portion 202-AL of a second metal resonator head 202. For example, an arm portion 202-AL (of one resonator head 202) on a lower surface 231L of a PCB 231 may extend under an arm portion 202-A (of another resonator head 202) on an upper surface 231U of the PCB 231. This vertical overlap between the arm portions 202-AL and 202-A of different resonator heads 202 may strengthen capacitive coupling between the resonator heads 202.

Figure 3A:
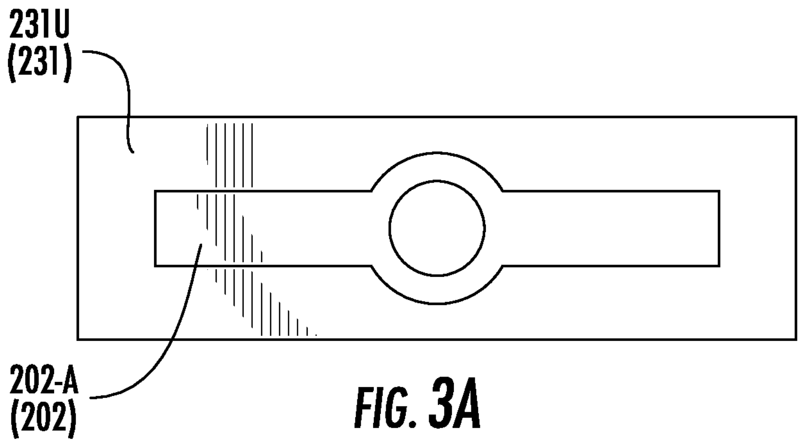
FIGS. 3A and 3B are top views illustrating a method of laser-tuning the filter of FIG. 2A.
Figure 3B:
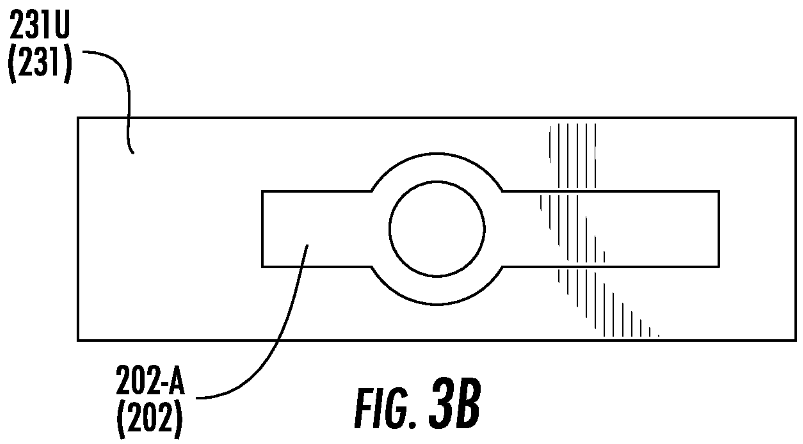

FIGS. 3A and 3B are top views illustrating a method of laser-tuning the filter 200 (FIG. 2A). As shown in FIG. 3A, the filter 200 includes a metal resonator head 202 having a plurality of metal resonator arms 202-A on an upper surface 231U of a PCB 231. For tuning purposes, it may be desirable to remove some of the metal of one of the resonator arms 202-A. Accordingly, as shown in FIG. 3B, some of the metal of the resonator arm 202-A on the left side of the resonator head 202 may be removed using a laser. As a result, the filter 200 may be tuned.

In some embodiments, the filter devices 100 (FIG. 1A) and 200 (FIG. 2A) may each include one or more in-line resonator filters, which can be implemented with respective linear arrays having any number of inner conductors (e.g., resonators R) with two input/output ports respectively connected to the first and last inner conductors in each linear array. As an example, first and second linear arrays of resonators R may be provided on PCBs 231 and 232 (FIG. 2A), respectively. Examples of in-line resonator filters are discussed in U.S. Pat. No. 10,236,550, the entire disclosure of which is incorporated herein by reference. Moreover, the filters 100 and 200 may be time division duplex ("TDD") filters, which may be less susceptible to passive intermodulation ("PIM") distortion than frequency division duplex ("FDD") filters.

Figure 4A:
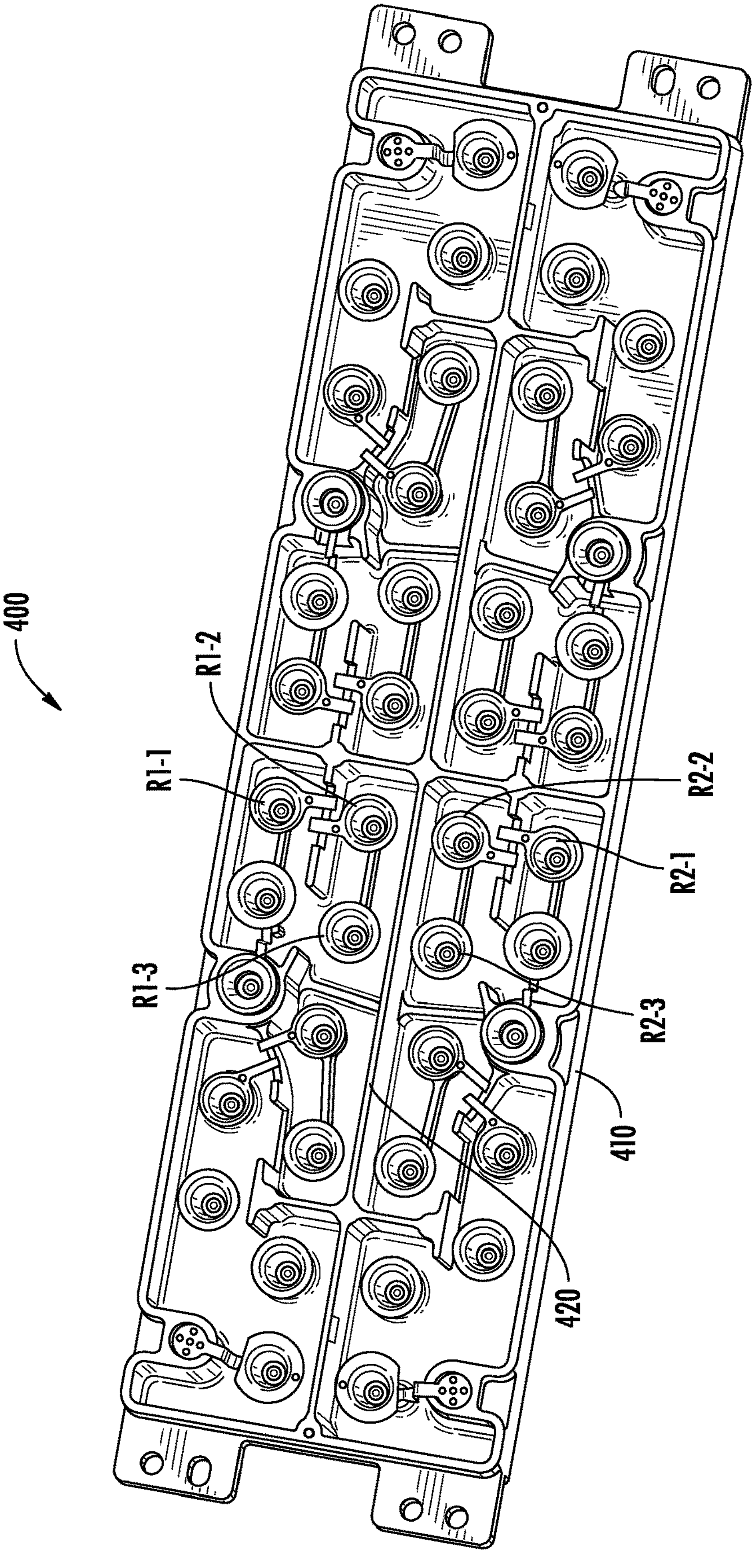
FIG. 4A is a top view of the inside of an RF filter according to further embodiments of the present inventive concepts.

FIG. 4A is a top view of the inside of an RF filter device 400 according to further embodiments of the present inventive concepts. As with the filter 100 (FIG. 1A) and the filter 200 (FIG. 2A), the filter 400 has resonators R that are inside a housing 410. For example, the filter 400 may include two filters, and resonators R1 of the first filter may be separated from resonators R2 of the second filter by an interior wall 420 that is inside the housing 410. The resonators R1 and R2 may provide respective paths (e.g., transmission paths) between two pairs of ports of the filter 400. Some of the ports may be coupled to respective antenna ports, such as ports of a base station antenna. For simplicity of illustration, only three resonators R1-1, R1-2, and R1-3 are labeled for the first filter, and only three resonators R2-1, R2-2, and R2-3 are labeled for the second filter.

Figure 4B:
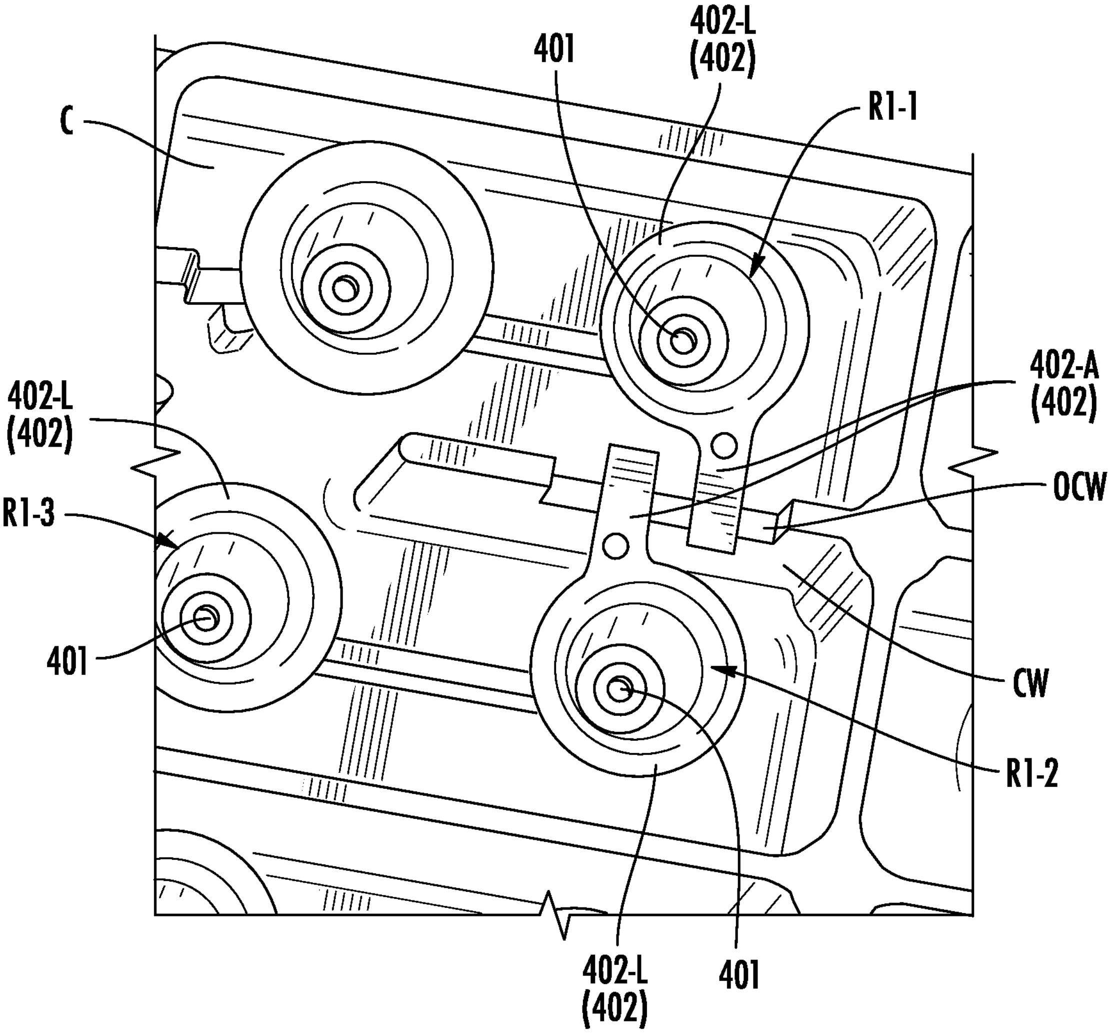
FIG. 4B is an enlarged view of a portion of the filter of FIG. 4A.

FIG. 4B is an enlarged view of a portion of the filter 400 of FIG. 4A. As shown in FIG. 4B, (a) an arm portion 402-A of a metal resonator head 402 of a first resonator R1-1 and (b) an arm portion 402-A of a metal resonator head 402 of a second resonator R1-2 may each extend into (e.g., through) an opening OCW in a cavity wall CW that is between respective resonator stalks 401 of the resonators R1-1 and R1-2. Accordingly, the pair of arm portions 402-A may be electromagnetically coupled to each other. For example, the pair of arm portions 402-A may be horizontally offset (i.e., adjacent and horizontally spaced apart) from each other in the opening OCW such that a side surface of one of the arm portions 402-A is electromagnetically coupled to a nearest side surface of the other arm portion 402-A. Moreover, the opening OCW may also be referred to as a "window" or "cutout" in the cavity wall CW, which may be a metal wall.

The arm portions 402-A extend horizontally outward from respective loop portions 402-L of the resonator heads 402, and the loop portions 402-L are on respective resonator stalks 401. For example, the arm portion 402-A of the resonator head 402 of the first resonator R1-1 may extend outward from the loop portion 402-L of that resonator head 402 toward the loop portion 402-L of the resonator head 402 of the second resonator R1-2. Similarly, the arm portion 402-A of the resonator head 402 of the second resonator R1-2 may extend outward from the loop portion 402-L of that resonator head 402 toward the loop portion 402-L of the resonator head 402 of the first resonator R1-1. Like the non-PCB resonator heads 102 (FIG. 1A), the resonator heads 402 may be non-PCB resonator heads.

Unlike how the non-PCB resonator heads 102 are depicted in FIG. 1A, however, some of the resonator heads 402 may have only a single arm portion 402-A rather than multiple arm portions. As an example, the first resonator R1-1 and the second resonator R1-2 may each have only a single arm portion 402-A extending outward from a respective loop portion 402-L. Moreover, others of the resonator heads 402, such as the resonator head 402 of the third resonator R1-3, may have a loop portion 402-L that is free of any arm portion 402-A extending outward therefrom.

Further unlike how the non-PCB resonator heads 102 are depicted in FIG. 1A, the resonator heads 402 may be bowl/dish-shaped rather than flat. Accordingly, each resonator head 402 may slope downward from the top of its loop portion 402-L toward a respective resonator stalk 401. In some embodiments, the top of the loop portion 402-L may be at a higher vertical level than the top of the resonator stalk 401.

Resonators R2-1, R2-2, and R2-3 (FIG. 4A) may include similar components/structures to those shown in FIG. 4B for the resonators R1-1, R1-2, and R1-3, respectively. For example, the resonators R2-1, R2-2 may each have a single arm portion that extends horizontally outward from a respective loop portion, whereas the resonator R2-3 may have a loop portion that is free of any arm portion extending outward therefrom. Moreover, a pair of the arm portions may be electromagnetically coupled to each other, and resonator heads of the resonators R2-1, R2-2, and R2-3 may be bowl/dish-shaped.

An RF filter device 200 (FIG. 2A) according to embodiments of the present inventive concepts may provide a number of advantages. These advantages include easier assembly and improved tolerances due to having multiple metal resonator heads 202 (FIG. 2B) on a single PCB 231 (FIG. 2B). By contrast, tolerances may be worse with resonator heads 102 (FIG. 1A) that are formed by metal punching, which may involve cutting interconnecting metal pieces with significant force. The PCB 231 can also host other elements, including stripline-based filter structures, such as a low-pass filter 241 (FIG. 2A). In some embodiments, the filter 200 may comprise two linear arrays of resonators R on respective PCBs 231 and 232 (FIG. 2A).

Moreover, the present inventive concepts can provide an RF filter device 100 (FIG. 1A) having metal resonator heads 102 (FIG. 1A) with arm portions 102-A (FIG. 1B) that extend toward each other to strengthen coupling between pairs of resonator heads 102 relative to disc-shaped (e.g., dish-shaped) resonator heads that are farther apart from each other. Though the resonator heads 102 are not on a PCB, the PCB-based resonator heads 202 of the filter 200 may similarly have arm portions 202-A (FIG. 2B) that can strengthen coupling between pairs of resonator heads 202. In some embodiments, each resonator head 102 may have a loop portion 102-L (FIG. 1B) from which multiple arm portions 102-A laterally extend. Similarly, each resonator head 202 may have a loop portion 202-L (FIG. 2B) from which multiple arm portions 202-A laterally extend.

The present inventive concepts have been described above with reference to the accompanying drawings. The present inventive concepts are not limited to the illustrated embodiments. Rather, these embodiments are intended to fully and completely disclose the present inventive concepts to those skilled in this art. In the drawings, like numbers refer to like elements throughout. Thicknesses and dimensions of some components may be exaggerated for clarity.

Spatially relative terms, such as "under," "below," "lower," "over," "upper," "top," "bottom," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the example term "under" can encompass both an orientation of over and under. The device may be otherwise oriented (rotated 90 degrees or at other orientations) and the spatially relative descriptors used herein interpreted accordingly.

Herein, the terms "attached," "connected," "interconnected," "contacting," "mounted," and the like can mean either direct or indirect attachment or contact between elements, unless stated otherwise.

Well-known functions or constructions may not be described in detail for brevity and/or clarity. As used herein the expression "and/or" includes any and all combinations of one or more of the associated listed items.

The terminology used herein is for the purpose of describing particular embodiments only and is not intended to be limiting of the present inventive concepts. As used herein, the singular forms "a," "an," and "the" are intended to include the plural forms as well, unless the context clearly indicates otherwise. It will be further understood that the terms "comprises," "comprising," "includes," and/or "including" when used in this specification, specify the presence of stated features, operations, elements, and/or components, but do not preclude the presence or addition of one or more other features, operations, elements, components, and/or groups thereof.

That which is claimed is:

1. A filter device comprising:

a housing;

first resonator stalks inside the housing;

second resonator stalks inside the housing;

a first printed circuit board (PCB) on the first resonator stalks, the first PCB comprising a plurality of metal resonator heads that are electrically connected to the first resonator stalks, respectively;

a second PCB on the second resonator stalks; and a wall inside the housing between the first resonator stalks and the second resonator stalks.

2. The filter device of claim 1, wherein each of the metal resonator heads respectively comprises:

a loop portion on a respective one of the first resonator stalks; and at least one arm portion that extends outward from the loop portion.

3. The filter device of claim 2, wherein the first PCB further comprises a plurality of first openings, and wherein the first resonator stalks extend upward through the first openings, respectively, and through the loop portions, respectively.

4. The filter device of claim 3, wherein the first PCB further comprises a plurality of second openings that are between respective pairs of the arm portions that extend toward each other.

5. The filter device of claim 1, further comprising a low-pass filter on at least one of the first and second PCBs.

6. The filter device of claim 1, wherein the first resonator stalks and the housing are different portions of a single metal piece.

7. A filter device comprising first and second resonator stalks in respective first and second openings in a printed circuit board (PCB), the PCB comprising first and second metal resonator heads that are on and electrically connected to the first and second resonator stalks, respectively, wherein the first metal resonator head comprises a first loop portion on the first resonator stalk, wherein the second metal resonator head comprises a second loop portion on the second resonator stalk, and wherein the PCB has a shape that tapers inward toward the first loop portion of the first resonator head and/or the second loop portion of the second resonator head when viewed in plan view.

8. The filter device of claim 7, wherein the first metal resonator head comprises a first arm portion that extends outward from the first loop portion, and wherein the second metal resonator head comprises a second arm portion that extends outward from the second loop portion.

9. The filter device of claim 8, wherein the first metal resonator head further comprises a third arm portion that extends outward from the first loop portion, and wherein the second metal resonator head further comprises a fourth arm portion that extends outward from the second loop portion.

10. The filter device of claim 7, further comprising third through eleventh resonator stalks in respective third through eleventh openings in the PCB, wherein the PCB has third through eleventh metal resonator heads that are on the third through eleventh resonator stalks, respectively.

11. A filter device comprising:

a housing;

a plurality of resonators inside the housing, wherein each of the resonators comprises:

a respective resonator stalk; and a respective metal resonator head comprising a loop portion that is on the resonator stalk and a plurality of arms that extend outward from the loop portion;

a printed circuit board (PCB), wherein the metal resonator head of each of the plurality of resonators is on the PCB; and a low-pass filter on the PCB.

12. The filter device of claim 11, wherein the PCB is on respective upper portions of the resonator stalks.

13. The filter device of claim 12, wherein the metal resonator heads are on an upper surface of the PCB.

14. The filter device of claim 13, wherein the upper portions of the resonator stalks extend through respective openings in the PCB to protrude upward beyond the upper surface of the PCB.

15. The filter device of claim 11, wherein the resonator stalks are respective first resonator stalks, wherein the metal resonator heads are respective first metal resonator heads, and wherein the filter device further comprises:

second resonator stalks inside the housing; and a wall inside the housing between the first resonator stalks and the second resonator stalks.

16. The filter device of claim 15, wherein the PCB comprises:

a first printed circuit board (PCB) comprising the first metal resonator heads on the first resonator stalks, respectively; and a second PCB comprising second metal resonator heads on the second resonator stalks, respectively, wherein the first and second PCBs are PCBs of first and second bandpass filters, respectively.

17. The filter device of claim 11, wherein the PCB has a shape that tapers inward toward the loop portion of the resonator head of each of at least a subset of the plurality of resonators such that a width of the PCB increases with increasing distance from the loop portion of the resonator head when viewed in plan view.

* * * * *